United States Patent [19]

Ham et al.

[11] Patent Number: 4,849,092
[45] Date of Patent: Jul. 18, 1989

[54] PROCESS FOR REGENERATING A HYDROCARBON HYDROCONVERSION CATALYST

[75] Inventors: Pierre Ham, La Celle St Cloud; Jean-Paul Dessapt, Beynes; Didier Bischoff; Jean de Bonneville, both of Rueil Malmaison, all of France

[73] Assignee: Institut Francais du Petrole, Rueil Malmaison, France

[21] Appl. No.: 89,106

[22] Filed: Aug. 25, 1987

[30] Foreign Application Priority Data

Aug. 25, 1986 [FR] France ................... 86 12109

[51] Int. Cl.$^4$ ............... C10G 35/09; C10G 49/06; B01J 38/20; B01J 23/96
[52] U.S. Cl. .................... 208/140; 208/139; 502/37; 502/49; 502/52
[58] Field of Search ................. 208/140, 139

[56] References Cited

U.S. PATENT DOCUMENTS

| | | | |
|---|---|---|---|
| 3,000,814 | 9/1961 | Hemminger et al. | 208/140 |
| 3,875,049 | 4/1975 | Kluksdahl | 208/140 |
| 4,058,450 | 11/1977 | La Page et al. | 208/139 |
| 4,133,743 | 1/1979 | Boret et al. | 208/140 |
| 4,213,849 | 7/1980 | Engelhard et al. | 208/139 |
| 4,218,338 | 8/1980 | Huin et al. | 208/140 |
| 4,329,258 | 5/1982 | Engelhard et al. | 208/139 |

Primary Examiner—Paul E. Konopka
Attorney, Agent, or Firm—Millen, White & Zelano

[57] ABSTRACT

The invention concerns a process for regenerating a hydrocarbon hydroconversion catalyst containing a carrier, at least one group VIII noble metal and a halogen or halogenated compound.

It is characterized by an operation in two regeneration zones (1) and (2). The gas effluent from the first regeneration zone (1) is used to feed the second regeneration zone. During the step of burning coke deposited onto the catalyst in the first zone, the heat amount generated during the combustion is used for preheating the feed of said first zone. The temperature of the effluent of said first zone is reduced, through said exchanger, to a value adapted to perform the burning step in the second zone. Additional air is supplied before introducing the gas into said second zone (2) in order to obtain a suitable oxygen concentration.

8 Claims, 1 Drawing Sheet

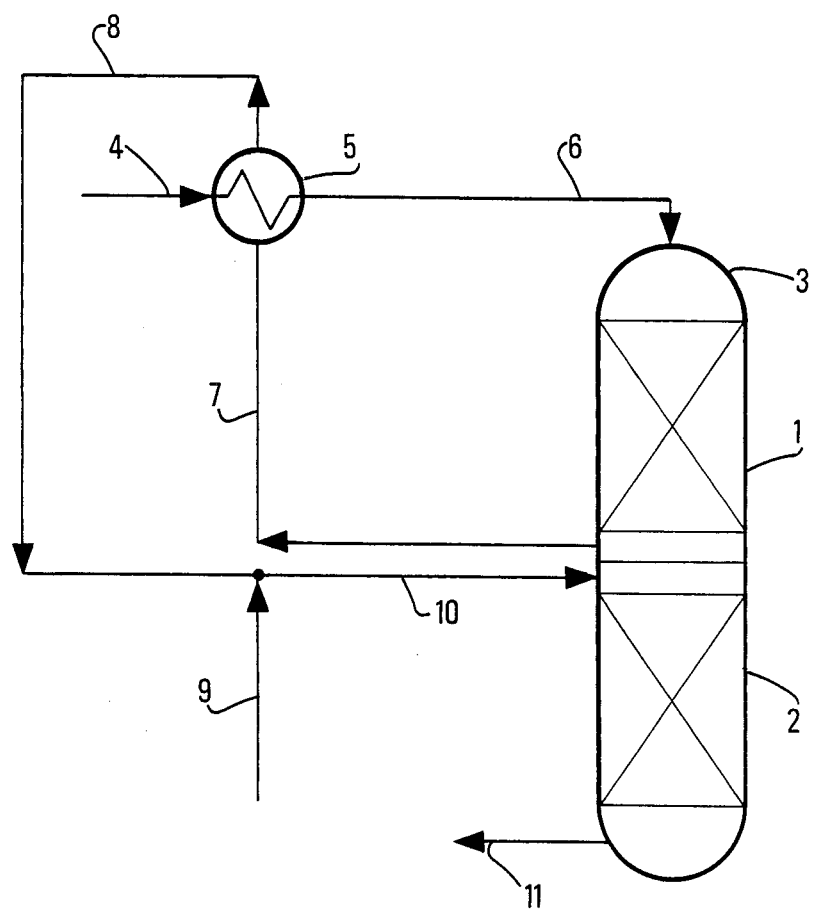

PROCESS FOR REGENERATING A HYDROCARBON HYDROCONVERSION CATALYST

The present invention concerns a process for regenerating a catalyst containing a carrier and at least one metal as well as a specified proportion of halogen, for example 0.1–10% by weight. The present invention thus concerns the regeneration of a catalyst used for conversion of hydrocarbons and particularly of a catalyst used for hydroreforming hydrocarbons or of a catalyst for producing aromatic hydrocarbons, for example benzene, toluene and xylenes (ortho, meta or para), either from saturated or unsaturated gasolines (for example cracking pyrolysis gasolines, particularly steam-cracking or catalytic reforming gasolines), or from naphthenic hydrocarbons which can be converted to aromatic hydrocarbons by dehydrogenation.

The invention also concerns the regeneration of a catalyst for dehydrogenating saturated, naphthenic or paraffinic hydrocarbons, for isomerizing alkylaromatic compounds, or, for example, for hydrocarbon alkylation or hydrocracking.

BACKGROUND OF THE INVENTION

The general conditions for the catalytic hydroreforming reactions are as follows: the average temperature of the reactor or reaction zone ranges from about 480° to 600° C., the pressure is in the range from 5 to 20 kg/cm$^2$, the hourly velocity ranges from 0.5 to 10 volumes of liquid naphtha per volume of catalyst and the recycling rate from 1 to 10 moles of hydrogen per mole of charge. The charge may be a naphtha distilling between about 60° C. and about 220° C., particularly a straight-run naphtha. The catalyst contains, for example, at least one noble metal from the platinum family, i.e. a noble metal such as platinum, palladium, iridium, ruthenium or osmium, deposited on a carrier of alumina or an equivalent compound. The total content of noble metals is from 0.1 to 2.0 % by weight in proportion to the catalyst and the halogen (preferably chlorine or fluorine) content is from 0.1 to 10% by weight. Other types of carriers, such as amorphous or crystallized silica-aluminas, silica-magnesias, silica-thorias, alumina-magnesias etc . . . , can be used.

The catalyst may contain at least one other metal promoter selected from various groups of the periodic classification of elements.

The general conditions for reactions producing aromatic hydrocarbons from saturated or unsaturated gasolines (process of "Aromizing" type or similar) are for example as follows:

When the charge is unsaturated, i.e. when it contains diolefins and monoolefins, it must be first freed therefrom by selective or complete hydrogenation. Then, the charge, optionally freed by hydrogenation from substantially all the diolefines and monoolefins contained therein, if any, is subjected, in each reaction zone, to a hydrogen treatment, in the presence of a catalyst comprising a carrier, 0.1 to 10% by weight of halogen and at least one group VIII noble metal (of the platinum family) and also optionally at least one other conveniently selected metal promoter. The content of metals of the platinum family is generally from 0.005 to 5% by weight. The carrier is selected from aluminas and chlorinated and/or fluorinated aluminas, or other similar compounds comprising silica-aluminas, silica-magnesias, silica-thorias, alumina-magnesias, etc . . . .

The reaction is conducted at a temperature from about 500° to 600° C., under a pressure from 1 to 60 kg/cm$^2$, the hourly volume flow rate of the liquid charge being of about 0.1–10 times the catalyst volume and the hydrogen/hydrocarbons molar ratio being of about 0.5–20.

The general conditions for dehydrogenating naphthenic and paraffinic saturated hydrocarbons (having 3–40 carbon atoms per molecule), are as follows: These reactions are performed in the presence of catalysts of the same type as reforming catalysts, at a temperature usually from 300° to 600° C., under a pressure ranging from 0.1 to 30 volumes of liquid charge per volume of catalyst. The hydrogen/hydrocarbons molar ratio at the reactor input is usually from 0.1 to 30.

For the isomerization of alkyl-aromatic compounds and more particularly for the isomerization of $C_8$ alkyl aromatic hydrocarbons (i.e. xylenes, ethyl benzene and mixtures thereof of composition not corresponding to the thermodynamic equilibrium, and specially mixtures whose paraxylene content is lower than that existing at said equilibrium), the conditions are as follows:

The catalyst comprises, in addition to a conventional carrier at least one metal element having a hydrogenating-dehydrogenating activity for converting ethyl-benzene and also for reducing the catalyst clogging due to the formation and deposition onto the solid of heavy products resulting from a still possible parasitic polymerization.

The one or more metal elements having a hydrogenating-dehydrogenating activity will be particularly selected from group VIII noble metals, i.e. the noble metals of the platinum family, with the optional addition of metals or derivatives of metals from group VI-A (chromium, molybdenum, tungsten) of the periodic classification of elements.

The amount of metal element, or of each metal element when several metal elements are involved, generally ranges from 0.005 to 1% of the catalyst weight.

The reaction will be conducted at a temperature from about 350° C. to 500° C., a pressure from about 5 to 30 bars, a space velocity from about 0.5 to 10 volumes of liquid charge per catalyst volume and per hour and a hydrogen/hydrocarbons ratio ranging from about 2 to 10 (by moles).

The catalyst to be regenerated, which generally contains 0.005 to 5% of at least one noble metal of the platinum family and 0.1–10% of halogen, for example chlorine, is supplied either from a reservoir where it has been stored before being subjected to regeneration or directly from the reactor where the reaction was performed. This catalyst, for example as particles, may be shaped as spheric balls of a diameter generally ranging from 1 to 3 mm, preferably from 1.5 to 2 mm, these values being not limitative. The bulk density of the catalyst is usually from 0.4 to 1, preferably from 0.5 to 9, more particularly from 0.55 to 0.8, these values being not limitative.

The catalyst regeneration is performed in an enclosure where the catalyst is treated as fixed or moving bed. In said enclosure the catalyst is successively subjected, for example, to:

(a) a combustion by means of a molecular oxygen-containing gas, (b) a simultaneous chlorination or oxychlorination by means of a molecular oxygen-containing gas and of halogen (e.g. chlorine) or halogenated compound, for example a hydracid or alkyl halide, or a halogen halogenated compound mixture.

(c) a final treatment with a gas containing a high proportion of molecular oxygen.

The regeneration may be performed in a regeneration zone wherein the catalyst to be regenerated is arranged in a fixed bed. The catalyst is then regenerated in the fixed bed in three successive steps (a), (b) and (c) successively performed on the fixed catalyst bed.

Detailed conditions for the regeneration process are preferably as follows:

(a) the first step corresponds to the combustion of the coke deposits. This operation is performed by introducing air in an inert mixture (formed for example of nitrogen and carbon dioxide), this inert mixture being used as thermal diluent. The oxygen content of the regeneration gas supplied is preferably from 0.01 to 1% by volume. The air supplied is consumed by combustion of the coke deposits and the end of the combustion is easily detected by the increase of the oxygen content of the gas flowing out from the regenerator and also by the disappearance of the flame front (the horizontal plane where the combustion occurs) which propagates downwardly through the catalyst bed. The combustion is achieved at an average temperature ranging preferably from 350° to 550° C., under a pressure of, for example, 1–15 kg/cm$^2$.

The combustion temperature is adjusted by controlling the oxygen concentration, the gas temperature at the regenerator input, as well as the gas velocity, so as to maintain the temperature at the level of the flame front, which is lower than that corresponding to the beginning of roasting, generally below 700° C., preferably of about 450° C. This gas flow is maintained for a sufficient time to remove coke from the catalyst. Accordingly, substantially all the coke can be removed by this way.

Generally, the amount of coke remaining on the catalyst may be reduced to about 0.5% by weight in 4 hours of regeneration and to less than 0.1% in 6 hours.

(b) The second step corresponds to the catalyst chlorination or oxyhalogenation. For oxyhalogenation, the oxygen content of the regeneration gas supplied to the regenerator is increased up to a value from 1 to 8% by volume, by simultaneously introducing a compound containing a halogen (chlorine or fluorine), i.e. either a halogen (mainly chlorine or fluorine) or a hydracid (e.g. HCl, HF or HBr) or an alkyl halide containing 1–6 carbon atoms per molecule, for example chloroform, tert-butyl chloride, cyclohexyl chloride, isopropyl fluoride, tert-butyl fluoride, cyclohexyl fluoride, dichlorodifluoromethane or preferably carbon tetrachloride. The alkyl halide is used in an amount sufficient to form an alumina halogenated derivative in a proportion of 0.5–1.2% by weight of the catalyst subjected to regeneration. Mixtures of halogenated compounds, for example a mixture of chlorine and hydrochloric acid containing about 5–60% of hydrochloric acid and 95–40% of carbon tetrachloride, can also be used. Other halogenated compounds such for example as thionyl chloride or nitrosyl chloride, ammonium chloride or fluoride, halogenated organic acids such as monochloroacetic and trichloracetic acids, or any other equivalent compound may also be used.

The chlorination or oxyhalogenation is conducted at an average temperature from 350° to 550° C. under a pressure from about 1 to 15 kg/cm$^2$. This treatment lasts for example from 20 mn to 3 hours, generally about 1 hour.

(c) The third final regeneration step corresponds to the oxidation of the catalyst. It is performed by further increasing the oxygen content of the regeneration gas supplied to the regenerator up to a value from 3 to 20% by volume and then maintaining the regenerator at an average temperature from 350° to 550° C. under an average pressure from 1 to 15 kg/cm$^2$. This operation lasts for example from 30 mn to 6 hours, preferably from 40 minutes to 2 hours. It is generally about 2 hours.

After the third step, the regenerator is usually purged with nitrogen, then filled with hydrogen in pressure equilibrium with the the reaction zone where the catalyst will be introduced. The catalyst is then stored or immediately transferred from the regenerator to a reactor through a suitable valve system. But, before being introduced into a reactor, or at the top therof, the catalyst is generally first treated with a hydrogen stream at a temperature for example of 300°–550° C. and under a pressure for example 3 to 25 kg/cm$^2$, preferably from 5 to 20 kg/cm$^2$. The catalyst sulfurization, when necessary, will be performed in said space or at the top of the reactor itself or in various lines for transferring the catalyst to the top of said reactor.

SUMMARY OF THE INVENTION

The principle of the invention consists of distributing the catalyst to be regenerated among two regeneration zones. The gas flowing out from the first zone is used in the second regeneration zone after cooling and adjustment of the oxygen amount.

In the process of the present invention, the regeneration zone is replaced by two regeneration zones. The catalyst charged into the regenerator originates from a buffer drum where the used catalyst withdrawn from the reaction zone was accumulated.

These two regeneration zones may be arranged side-by-side and then filled simultaneously with catalyst, or arranged one above the other, the lower zone being then generally the first to be filled.

In these two regeneration zones, the catalyst is arranged in a fixed bed.

An important stage which is responsible for the size of the equipment is the stage of burning coke deposited onto the catalyst. For a given oxygen percentage, the burning time is proportional to the amount of gas in contact with the catalyst.

When, according to the prior art, only one regeneration zone was used, a gas hourly flow rate of V Nm$^3$/h was necessary to produce in a given time the combustion of the catalyst coke. According to the present invention, a gas hourly flow rate of V/2 Nm$^3$/h is sufficient to perform the combustion of the same coke amount of the catalyst, in the same time.

Generally, the temperature of the gas feeding either a regeneration zone (as according to the prior art) or two regeneration zones (as according to the present invention) is about 400° C. during coke combustion, by way of example. The corresponding temperature of the gas flowing out from the first zone is for example about 470° C.

This gas effluent from the first zone is at a too high temperature for operating in the second zone in the same manner as in the first one and it must be cooled, according to the present invention.

For this purpose it is supplied to an exchanger where the gas feeding the first zone flows counter-currently, said last gas being introduced into the exchanger at a lower temperature then the intake temperature in the first regeneration zone.

Thus, the heat taken from the gas effluent from the first regeneration zone is used to preheat the combustion gas of said first regeneration zone. By way of example, the gases of decreased oxygen content withdrawn at 470° C. from the first regeneration zone are discharged from the exchanger at a temperature of about 400° C., i.e. a suitable temperature for introducing these gases (after addition of oxygen) into the second regeneration zone, whereas the combustion gas which has to be introduced at about 400° C. into the first regeneration zone is first introduced into said exchanger at, for example, 330° C. and flows out therefrom at, for example, 400° C.

Thus, the invention concerns a process for regenerating a hydrocarbon hydroconversion catalyst containing (a) a carrier, (b) 0.005-5% of at least one noble metal of the platinum family and 0.1-10% of halogen.

In this process the used catalyst is distributed among at least two regeneration zones and arranged therein as a fixed bed, the regeneration process beginning with a first combustion step of coke deposited onto the catalyst, by means of a molecular oxygen-containing gas, introduced at temperature T in each regeneration zone, the process being characterized by the steps of:

(a) introducing, before the combustion step, said molecular oxygen-containing gas at a temperature T', lower than T, into an exchanger at the output of which said gas reaches a temperature substantially equal to T, (b) introducing said gas, at temperature T, into a first regenetion zone in order to burn the coke of the catalyst present in said first regeneration zone, (c) withdrawing a gas of decreased oxygen content from the first regeneration zone at a temperature T1 higher than T and then feeding it to said exchanger defined in paragraph (a), at the intake of which said gas of decreased oxygen content is at a temperature substantially equal to T, (d) feeding said gas at a temperature substantially equal to T, after oxygen addition either before or after passage through said exchanger, to at least one other regeneration zone in order to burn the coke of the catalyst in said other regeneration zone.

The advantage of the invention wherein two regeneration zones are used, consists in the possibility to treat the same catalyst amount with a gas hourly flow rate of one half of that usually used to burn the coke of the catalyst. Accordingly, the size of the equipment for conveying and treating the gases are reduced by one half. This concerns the exchangers, the furnace, the compressor, the dryer, etc . . . .

The immediate advantage of this reduction of the equipment size concerns the amount of inert gas (inert gas or nitrogen) required for the final purge. This consumption is in fact reduced by one half.

Thus, for example, for regenerating 2.5 tons of catalyst, a gas flow rate of 14 t/h was required. With two regeneration zones operating according to the invention, 7 tons of gas per hour are sufficient.

The advantage of the invention appears the more evident as it is known, for example, that some catalytic reforming units require the regeneration of 10 or even 20 tons of catalyst per day.

BRIEF DESCRIPTION OF THE DRAWING

The present invention will be now described more in detail by way of illustrative and non limitative example with reference to the accompanying drawing wherein the single FIGURE illustrates the use of two regeneration zones.

In this FIGURE, for sake of simplicity, the catalyst intake and withdrawing lines of the two regeneration zones 1 and 2, both located in the same enclosure 3, have not been shown. The gas required for coke combustion in the regeneration zone 1, called combustion gas, is supplied through line 6 at temperature T, after previous heating by passage through exchanger 5 where it has been introduced through line 4 at a temperature T' lower than T, for example 10°-60° C. (more particularly 20°-50° C.) lower than T.

The gas of decreased oxygen content is withdrawn from zone 1 through line 7, at a temperature T1 higher than T and for example, 40°-110° C. (more particularly 50°-90° C.) higher than T. The gas of line 7 passes through exchanger 5 where it transfers heat to the combustion gas. it flows out from exchanger 5 through line 8, at a temperature substantially equal to T±Δ, Δ ranging from about 0° to 15° C., preferably from 0° to 8° C. or even from 0° to 4° C. A further oxygen amount is then added thereto through line 9, said addition taking place after passage through the exchanger according to the flow-sheet arrangement of the figure, but it may also take place before said passage.

There is thus obtained in line 10, a gas of suitable composition and temperature for performing the combustion of the coke of the catalyst placed in the second regeneration zone. Gases of reduced oxygen content are withdrawn from the second regeneration zone through line 11.

By way of example, the two regeneration zones operating according to the process of the invention are at the following temperatures:

|  | Combustion |
| --- | --- |
| Gas of line 4 (combustion gas before supply to exchanger 5) | 389° C. |
| First regeneration zone input (line 6) | 420° C. |
| First regeneration zone output (inside the regeneration zone) | 470° C. |
| First regeneration output line (line 7) | 469° C. |
| Second regeneration zone input (line 10) | 419° C. |
| Second regeneration zone output (line 11) | 470° C. |

The invention is particularly adapted for the regeneration of reforming catalysts comprising platinum-tin or platinum-rhenium as main constituents and particularly for reforming processes comprising an arrangement wherein a first type of one or more catalyst fixed beds is operated at low severity (Research octane number (RON) of the product obtained at the output of the first beds ranging from 85 to 95, more particularly from 87 to 92) and wherein a second type of catalyst, placed as a moving bed into a last reactor with continuous catalyst regeneration according to the invention, operates with high severity, thus providing a final reformate of high RON, generally higher than 95 and mostly higher than 98 or even 100.

All the reactors may then operate under low pressure so as to take advantage of the yield gains which can be expected by operating at low pressure.

The first type of catalyst used in the one or more first fixed beds wherethrough passes the charge, comprises:
(a) a carrier,
(b) generally 0.01-2% by weight, with respect to the carrier, of at least one noble metal of the platinum family, platinum being always present, preferably in an amount of 0.05-0.8% and more particularly 0.1-0.6% by weight,
(c) generally from 0.005 to 3% by weight of rhenium in proportion to the carrier, preferably 0.05-2%, more particularly 0.1-0.6% by weight,
(d) generally 0.1-15% of at least one halogen, in proportion by weight to the carrier, preferably 0.5-3% and more particularly 0.9-2.5% by weight.

The second type of catalyst used in at least the last catalyst bed (of the moving bed type) wherethrough passes the charge, contains:
(a) A carrier identical to or different from that of the first catalyst,
(b) advantageously 0.01-2% by weight, in proportion to the carrier, of at least one noble metal of the platinum family, platinum being always present, preferably 0.05-0.8% and more particularly 0.1-0.6% by weight,
(c) advantageously from 0.05 to 3% by weight of tin, preferably 0.07-2%,
(d) generally 0.1-15% of at least one halogen, in proportion by weight to the carrier, preferably 0.5-3%, more particularly 0.9-2.5% by weight.

The proportion by weight of tin-containing catalyst is advantageously from 15 to 70% in proportion to the total catalyst mass used in all the catalyst beds (optionally 25 to 55%).

By way of example, one of the following arrangements can be used:

two reactors in series, the first reactor containing two fixed beds of the first platinum and rhenium-containing catalyst, the second reactor, with continuous regeneration of the catalyst, containing a moving bed of the second platinum- and tin-containing catalyst.

three reactors in series, the first two with fixed beds, placed side-by-side or superposed, each containing one or more beds of the first platinum- and rhenium-containing catalyst, and the third reactor with continuous regeneration of the catalyst containing a moving bed of the second platinum- and tin-containing catalyst. Advantageously the first fixed bed may be axial, the one or more other fixed bed(s) being radial.

What is claimed as the invention is:

1. A reforming process comprising conducting a reforming reaction by circulating a hydrocarbon charge under reforming conditions in the presence of hydrogen, successively through at least two reaction zones in series, each of the one or more first reaction zones wherethrough passes the charge containing one or more fixed beds of a first catalyst comprising (a) a carrier, (b) platinum, (c) rhenium and (d) a halogen, each of the one or more last reaction zones wherethrough passes the charge containing one or more moving beds of a second catalyst which comprises (a) a carrier, (b) platinum, (c) tin and (d) halogen, and regenerating said second catalyst in at least two regeneration zones in each of which the used catalyst is arranged in fixed bed, said process comprising:
(a) feeding a molecular oxygen-containing gas at a temperature T', to an exchanger at the output of which said gas is at a temperature T higher than T',
(b) introducing said gas, at temperature T, into a first regeneration zone, so as to burn the coke of the catalyst present in said first regeneration zone,
(c) withdrawing from said first regeneration zone, at a temperature T1 higher than T, a gas of reduced oxygen content which is then supplied to said exchanger as defined in paragraph (a), at the output of which said gas of decreased oxygen content is at a temperature substantially equal to $T\pm\Delta$ ($\Delta$ ranging from 0° to 15° C.),
(d) feeding said gas at a temperature substantially equal to $T\pm\Delta$, after addition of make-up oxygen either before or after passage through said exchanger, to a second regeneration zone, so as to burn the coke of the catalyst in said second regeneration zone.

2. A process according to claim 11, wherein the two regeneration zones are superposed.

3. A process according to claim 11, wherein the two regeneration zones are placed side-by-side.

4. A process according to claim 11, wherein T' is 10° to 60° C. lower than T and T1 is 40° to 110° C. higher than T.

5. A reforming process comprising conducting a reforming reaction by circulating a hydrocarbon charge under reforming conditions in the presence of hydrogen, and a catalyst which comprises (a) a carrier, (b) platinum, (c) tin and (d) halogen, and regenerating said catalyst in at least two regeneration zones in each of which the used catalyst is arranged in fixed bed, said process comprising:
(a) feeding a molecular oxygen-containing gas at a temperature T', to an exchanger at the output of which said gas is at a temperature T higher than T',
(b) introducing said gas, at temperature T, into a first regeneration zone, so as to burn the coke of the catalyst present in said first regeneration zone,
(c) withdrawing from said first regeneration zone, at a temperature T1 higher than T, a gas of reduced oxygen content which is then supplied to said exchanger as defined in paragraph (a), at the output of which said gas of decreased oxygen content is at a temperature substantially equal to $T\pm\Delta$ ($\Delta$ ranging from 0° to 15° C.),
(d) feeding said gas at a temperature substantially equal to $T\pm\Delta$, after addition of make-up oxygen either before or after passage through said exchanger, to a second regeneration zone, so as to burn the coke of the catalyst in said second regeneration zone.

6. A process according to claim 5, wherein the two regeneration zones are superposed.

7. A process according to claim 5, wherein the two regeneration zones are placed side-by-side.

8. A process according to claim 5, wherein T' is 10° to 60° C. lower than T and T1 is 40° to 110° C. higher than T.

* * * * *

UNITED STATES PATENT AND TRADEMARK OFFICE
CERTIFICATE OF CORRECTION

PATENT NO. : 4,849,092

DATED : July 18, 1989

INVENTOR(S) : HAM ET AL

It is certified that error appears in the above-identified patent and that said Letters Patent is hereby corrected as shown below:

Column 8, claim 2, line 23:

reads "A process according to claim 11, wherein the two"
should read -- A process according to claim 1, wherein the two --

Column 8, claim 3, line 25:

reads "A process according to claim 11, wherein the two"
should read --A process according to claim 1, wherein the two --

Column 8, claim 4, line 27:

reads "A process according to claim 11, wherein T' is 10°"
should read -- A process according to claim 1, wherein T' is 10°--

Signed and Sealed this

Seventeenth Day of April, 1990

*Attest:*

HARRY F. MANBECK, JR.

*Attesting Officer*     *Commissioner of Patents and Trademarks*